(12) United States Patent
Sugiyama et al.

(10) Patent No.: US 6,452,356 B1
(45) Date of Patent: *Sep. 17, 2002

(54) CHOPPING ENERGIZATION CONTROL DEVICE FOR ELECTRIC MOTOR

(75) Inventors: Masanori Sugiyama; Yoshihide Suzuki; Chiaki Homna, all of Aichi-ken (JP)

(73) Assignee: Aisin Seiki Kabushiki Kaisha, Aichi-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/528,154

(22) Filed: Mar. 17, 2000

(30) Foreign Application Priority Data

Mar. 18, 1999 (JP) .............................. 11-073698

(51) Int. Cl.[7] .............................. G05B 11/28
(52) U.S. Cl. .................. 318/599; 318/632; 318/635; 318/606
(58) Field of Search ................. 318/254, 701, 318/798–811, 599, 606, 632, 635

(56) References Cited

U.S. PATENT DOCUMENTS 4,933,621 A * 6/1990 MacMinn et al. .......... 318/701
5,296,787 A    3/1994 Albrecht et al.
5,821,707 A   10/1998 Kim
5,959,419 A *  9/1999 Sugiyama .................. 318/701
6,111,383 A *  8/2000 Sugiyama et al. .......... 318/599
6,137,256 A * 10/2000 Morris ....................... 318/701
6,181,092 B1 * 1/2001 Turner ....................... 318/254

FOREIGN PATENT DOCUMENTS

DE    40 36 565 C1   5/1992
DE    41 24 240 C2   8/1994
JP    7-274569      10/1995

* cited by examiner

Primary Examiner—Khanh Dang
(74) Attorney, Agent, or Firm—Sughrue Mion, PLLC

(57) ABSTRACT

In a chopping energization control device, a pair of switching elements IGBT/U and IGBT/L are used to control an electric power supplied from a DC power source to a phase coil CL1 of a DC motor, particularly an SR motor, such that one of the switching elements is alternately turned on-and-off while the other is being turned on continually. To avoid uneven heat generations between the switching elements, an arrangement is provided wherein whenever a time elapses beyond a limit value of, for example, 10 milliseconds the conditions of the respective switching elements are swapped with each other. Such a swapping is established cyclically which causes equal heat generations in the switching elements.

4 Claims, 8 Drawing Sheets

CHOPPING ENERGIZATION CONTROL DEVICE FOR ELECTRIC MOTOR

BACKGROUND OF THE INVENTION

The present invention is directed to a chopping energization control device which is associated with each of a plurality of phase coils which are provided on a stator of an electric motor such as a switched reluctance motor.

In switched reluctance motors, a chopping energization control is made by using an H-type switching circuit which is disclosed in Japanese Patent Laid-open Print No. Hei. 7-274569 published without examination in 1995. This switching circuit, as shown in FIG. 8, includes a first switching element 5, a second switching element 6, a first diode 7, and, a second diode 8. The first switching element 5 is interposed between one end of a phase coil 2 and a higher voltage line 3 of a power supply (not shown), while the second switching element 6 is interposed between the other end of the phase coil 2 and a lower voltage line 4 of the power supply. The first diode 7 is interposed between one end of the phase coil 2 and the lower voltage line 4 in such manner of allowing only one-way current pass from the latter to the former, while the second diode 8 is interposed between the other end of the phase coil 2 and the higher voltage line 3 in such a manner of allowing the current to pass only from the former to the latter. As each of the first switching element 5 and the second switching element 6, an insulated gate bipolar transistor (IGBT) is employed.

In the foregoing circuit, while both the first switching element 5 and the second switching element 6 are being turned on a DC current passes through the phase coil 2. On the other hand, when both the first switching element 5 and the second switching element 6 are being turned off or when one of the first switching element 5 and the second switching element 6 is turned on and the other is being turned off, the DC current fails to pass through the phase coil 2. The chopping energization control is initiated depending on a difference between the actual current value which passes through the phase coil 2 and a target current value which is to be passed therethrough and approximates the actual current value to the target current value.

The chopping energization control has three switching modes: a first mode, a second mode, and a third mode. The first mode is to repeat cyclically a condition under which both switching elements 5 and 6 are being concurrently turned on as shown in FIG. 8(a) and a condition wherein the both switching elements 5 and 6 are being concurrently turned off as shown in FIG. 8(b). The concurrent turning-on both the switching elements 5 and 6 as shown in FIG. 8(a) allows the current to pass through the phase coil 2, while concurrent turning-off both the switching elements 5 and 6 as shown in FIG. 8(b) causes a feedback current to the power supply due to an induced voltage in the phase coil. Such cyclic repetition of the concurrent turning-on the switching elements 5 and 6 and the concurrent turning-off the switching elements 5 and 6 causes a ripple current as shown in FIG. 8(c). Thus, in the first mode, as shown in FIG. 8(b), when both the switching elements 5 and 6 are turned off, the energy generated in the phase coil 2 is supplied to the higher voltage line 3 of the power supply which is sometimes said to be 'regeneration', thereby decreasing the current rapidly.

In the second switching mode, as shown in FIG. 9(a) and FIG. 9(b), the first switching element 5 is alternately or cyclically turned on and off with the second switching element 6 remaining tuned-on. In this second mode, as can be seen from FIG. 9(c), the current which passes through the phase coil 2 becomes slightly rippled and when the first switching element 5 and the switching element 6 are being turned off and turned on, respectively, with the result that the current decreases in gradual manner, the driving force of and radially extending attraction in the motor decrease in a gradual manner. Thus, the resultant vibration and noise become relatively small.

In the third mode, as illustrated in FIGS. 10(a) and (b), the second switching element 6 is alternately or cyclically turned on and off with the first switching element 5 remaining tuned-on. In this third mode, as can be seen from FIG. 10(c), the current which passes through the phase coil 2 becomes slightly rippled and when the first switching element 5 and the switching element 6 are being turned on and turned off respectively, with the result that the current decreases in a gradual manner, the driving force of and radially extending attraction in the motor decrease in a gradual manner. Thus, like in the second mode, the resultant vibration and noise become relatively small.

In general, when a load is driven by the motor, the chopping energization control uses either the second mode or the third mode, while if regeneration is required when the load is braked by the motor, the chopping energization uses the first mode.

As well known, when currents pass through the respective switching elements 5 and 6, losses occur therein, thereby generating heat, respectively. If the resultant heat-generation becomes excess, the switching elements 5 and 6 are brought into thermal breakdown or heat breakage. To avoid such a drawback, a power down control method is employed which decreases the current passing through the phase coil 2 immediately when one of the switching elements reaches its permissible limit temperature, with the result that the thermal breakdown of the respective switching elements 5 and 6 can be avoided, but on the other hand, the output decreases due to the decrease of the current.

The losses occur when each of the switching elements 5 and 6 is turned on and is brought into switching action. In the second mode or the third mode of the chopping energization control, the first switching element 5 differs from the second switching element 6 in turned-on time duration and switching frequency, thereby differentiating the first switching element 5 from the second switching element 6 in amount of heat generation. Thus, a heat difference is generated between the first switching element 5 and the second switching element 6. The degree of such a difference depends on ratings of the electric motor and each of the switching elements 5 and 6. Sometimes the turning-on loss is larger than the switching loss and sometimes vice-versa. Assuming that if the turning-on loss is larger than the switching loss, in the second mode of the chopping energization mode, the loss of the switching element 6 becomes larger than the loss of the switching element 5, the temperature of the switching element 6 becomes higher than the temperature of the switching element 5. By contrast, in the third mode of the chopping energization control, the lass of the switching element 5 becomes larger than the loss of the switching element 6, thereby increasing the temperature of the switching element 5 is greater than the temperature of the switching element 6.

In the case where a temperature difference occurs between the first switching element 5 and the second switching element 6 and the temperature of either of the switching elements reaches the permissible limit temperature, power down control begins, even if the remaining switching element is still below its permissible limit temperature, thereby decreasing the output.

In view of the foregoing circumstances, a need arises to prolong the required time duration for each switching element to reach its permissible limit temperature.

SUMMARY OF THE INVENTION

It is, therefore, a principal object of the present invention to provide a chopping energization control device which satisfies the request noted above.

In order to attain the foregoing object, the present invention provides a chopping energization control device for use with an electric motor in such a manner that the chopping energization control device adjusts a current which passes through a phase coil of the electric motor, the chopping energization control device comprises:

(a) switching element driving signal generating means for generating a first driving signal and a second driving signal when the electric motor drives a load;

(b) a first switching element interposed between one end of the phase coil and a high potential line of a power supply;

(c) a second switching element interposed between the other end of the phase coil and a low potential voltage line of the power supply;

(d) the first switching element taking an on state under which the first switching element is turned on by receiving therein the first driving signal while the second driving signal is transmitted to the second switching element;

(e) the second switching element taking an on state under which the second switching element is turned on by receiving therein the first driving signal while the second driving signal is transmitted to the first switching element;

(f) the first switching element taking an on-and-off state under which the first switching element is turned on-and-off alternately by receiving therein the second driving signal while the second switching element takes the on state;

(g) the second switching element taking an on-and-off state under which the second switching element is turned on-and-off alternately by receiving therein the second driving signal while the first switching element takes the on state; and (h) alternating means for repeating, in alternating cycles, the on-and-off state of the first switching element and the on-and-off state of the second switching element.

DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which.

DETAILED DESCRIPTION OF THE PRESENT INVENTION

A preferred embodiment of the present invention will be described hereinafter in detail with reference to the accompanying drawings.

Figure 1:
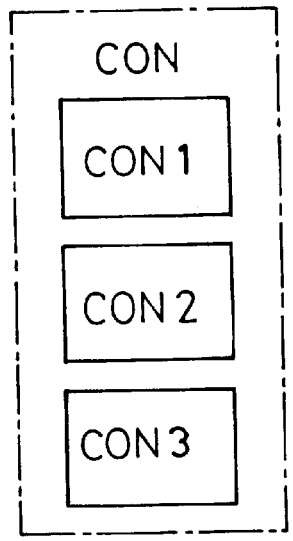
FIG. 1 illustrates a block diagram of an energization controller for a three-phase switched reluctance motor.

First of all, with reference to FIG. 1, there is illustrated a block diagram of an energization controller CON for a three-phase switched reluctance, motor (not shown) which is mounted, as a driving means, on an electric automotive vehicle (not shown). The energization controller CON is made up of a first control unit CON1, a second control unit CON2, and a third control unit CON3 which serve for controlling a first phase coil CL1 a second phase coil CL2, and a third phase coil CL3, respectively. The three-phase switched reluctance motor has twelve stator magnet poles and eight rotor magnetic poles.

The first control unit CON1, the second control unit CON2, and the third control unit CON3 are of substantially the same construction or structure.

Figure 2:
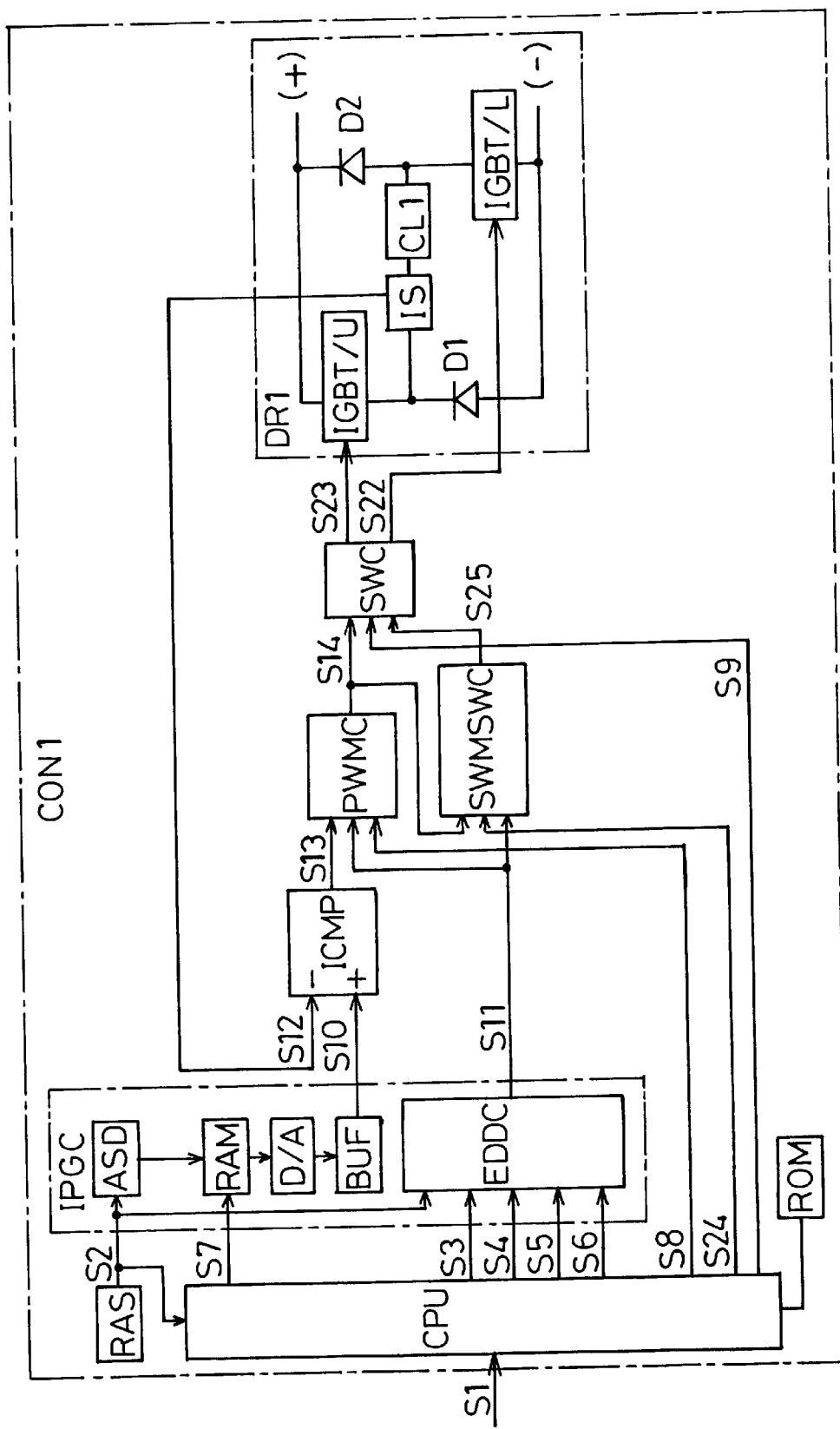
FIG. 2 illustrates a block diagram of a control unit of the energization controller shown in FIG. 1.

Referring next to FIG. 2, which illustrates a block diagram of the first control unit CON1, the first control unit CON1 for the first phase coil CL1 includes, as its major or principal components an angle sensor RAS, a memory ROM, a microprocessor CPU, a current waveform shaping circuit IPGC, a current compare circuit ICMP, a PWM signal generation circuit PWMC, a switching mode switching circuit SWMSWC, a switching circuit SWC, and a first phase coil driver DR1.

The angle sensor RAS detects an angular position of a rotor (not shown) of the switched reluctance motor, and the resultant angular position of the rotor is fed, as a digital signal S2, to the micro-processor CPU, an address decoder ASD and an energization/denergization determination circuit EDDC.

The memory ROM stores various information related to energization control of the first phase coil. In detail, the following are stored: the amount of rotation of the switched reluctance motor for opposite directions, a torque in each of positive and negative directions, a plurality of sets of energization starting angular position and energization terminating angular position, a plurality of current waveform data each of which is indicative of a target current to be applied to the first phase coil which corresponds to the detected angular position by the angle sensor RAS, and a plurality of PWM duty ratio data.

In response to a closure of a main switch (not shown) which is to be closed while the electric vehicle is traveling, the micro-processor CPU outputs a rest pulse signal S3 and a two-value signal indicative of normal or abnormal conditions to the energization/denergization determination circuit EDDC in the IPGC. The two-value signal indicates, when it takes HIGH and LOW, a normal condition and an abnormal condition, respectively.

If no abnormal condition is found, the micro-processor CPU continues to calculate the rotational number of the reluctance motor on the basis of the signal from the RAS. In addition, on the basis of a signal S1 which comes from at least any one of a shift lever, an acceleration switch, and an acceleration opening sensor, a target torque is calculated. The micro-processor CPU reads a set of energization starting time and denergization times, a current waveform, and a PWM duty ratio which correspond to a combination of the resultant rotational number and torque. The read-out energization starting time and denergization are outputted from the CPU as signals S5 and S6, respectively, to the energization/denergization determination circuit EDDC in the current waveform generation circuit IPGC.

The read-out waveform is fed, as a digital signal S7, to the RAM in the IPGC from the CPU. The read-out PWM duty ratio is fed, as a digital signal S8, to the PWM signal generation circuit PWMC from the micro-processor CPU. In addition, on the basis of the rotational direction (positive direction or negative direction) and the torque direction, the CPU decides whether or not a regenerative braking operation has to be initiated and feeds the result as a two-value signal S24, to the switching mode switching circuit SWMSWC. When the result is positive, the signal S24 takes LOW level. Otherwise the signal S24 takes HIGH level. If the signal S24 takes HIGH level or LOW level, the signal S24 indicates to or not to initiate regenerative operation, respectively.

Figure 6:
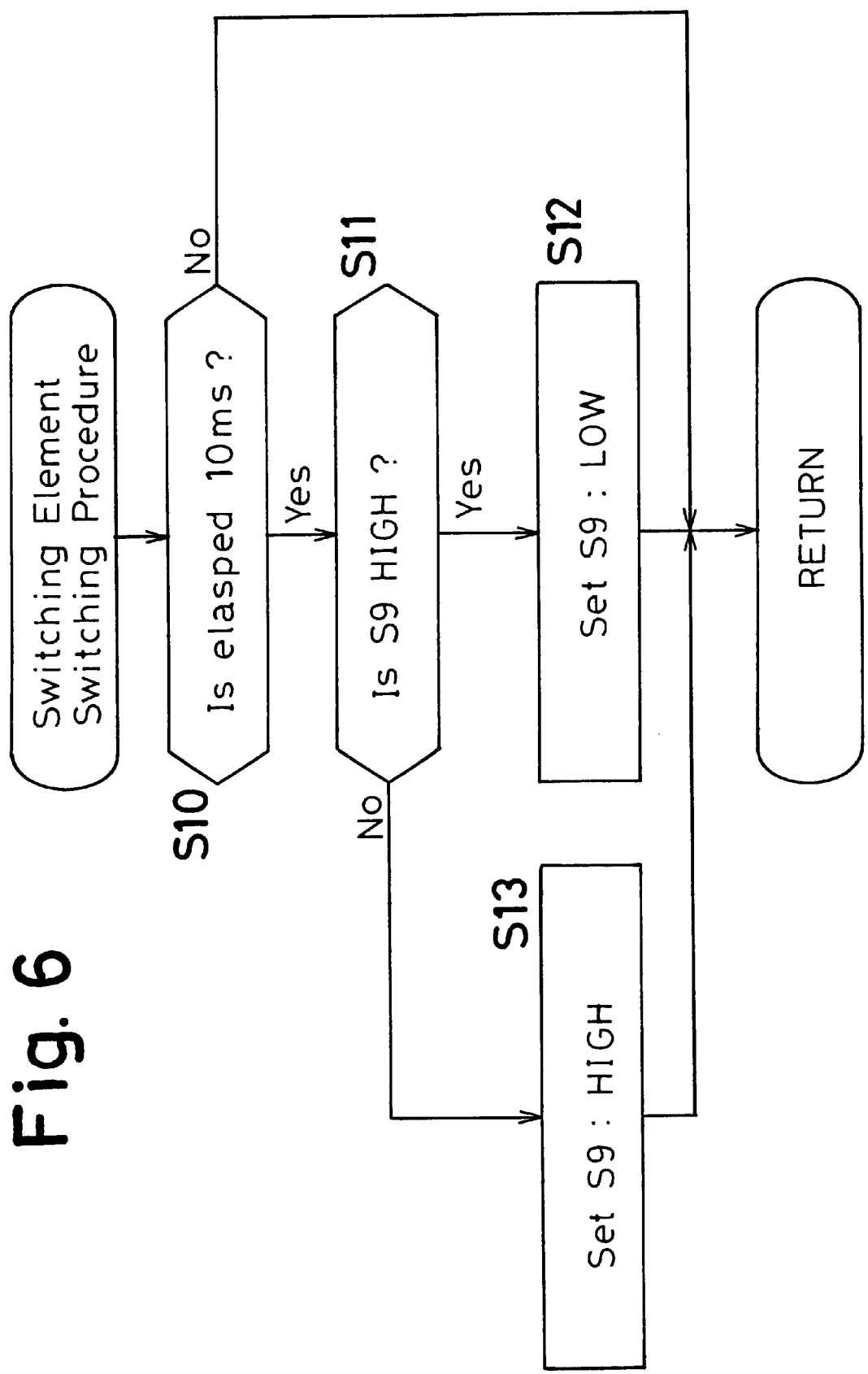
FIG. 6 illustrates a flow chart which provides a control of a switching element switching operation in a microprocessor.
Figure 8A:
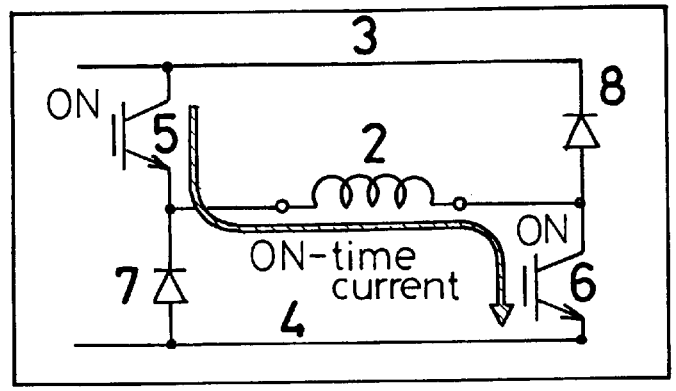
FIGS. 8a–8c illustrate conditions when a first operation mode is selected.
Figure 8B:
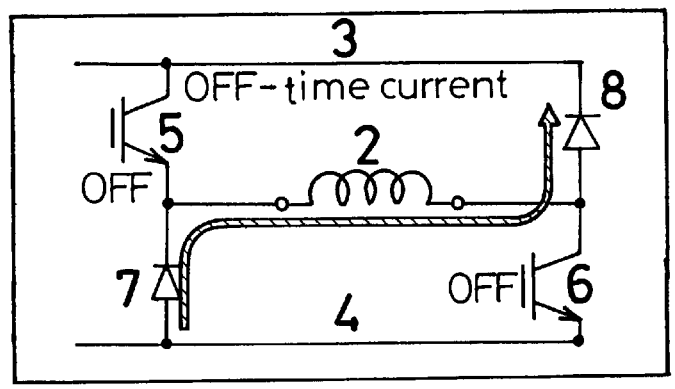
Figure 8C:
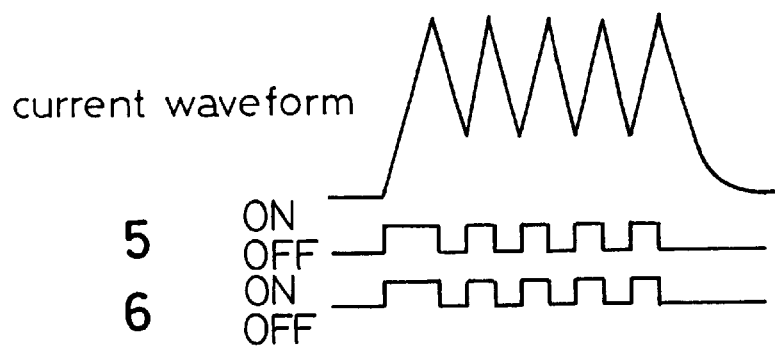
Figure 9A:
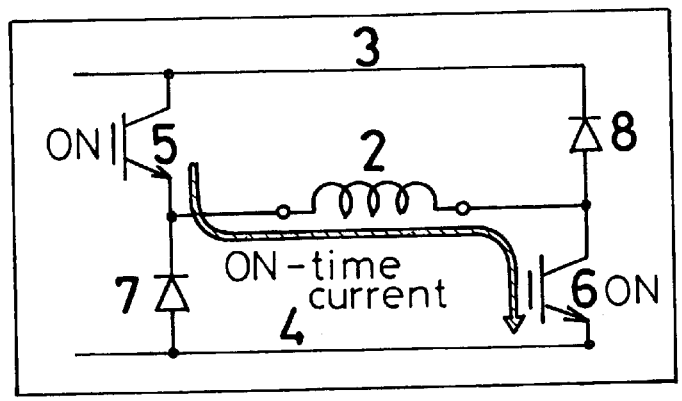
FIGS. 9a–9c illustrate conditions when a second operation mode is selected.
Figure 9B:
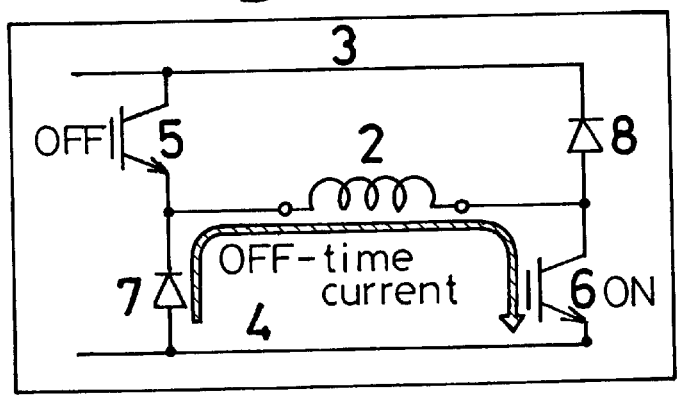
Figure 9C:
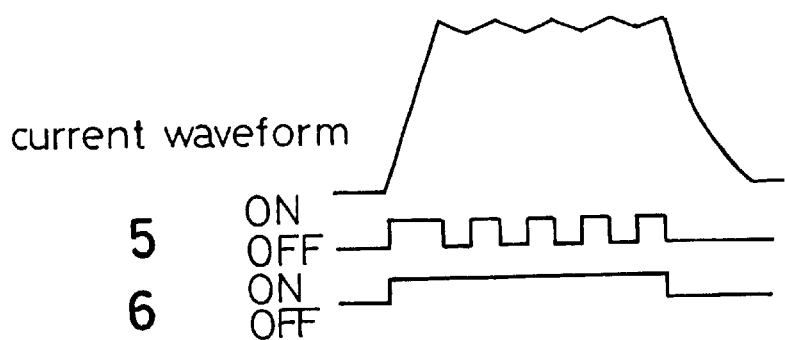
Figure 10A:
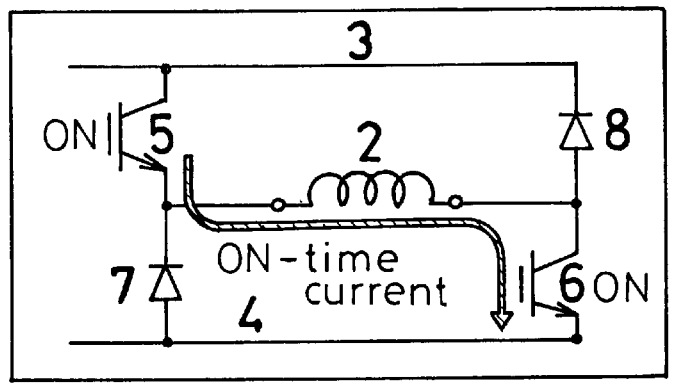
FIGS. 10a–10c illustrate conditions when a third operation mode is selected.
Figure 10B:
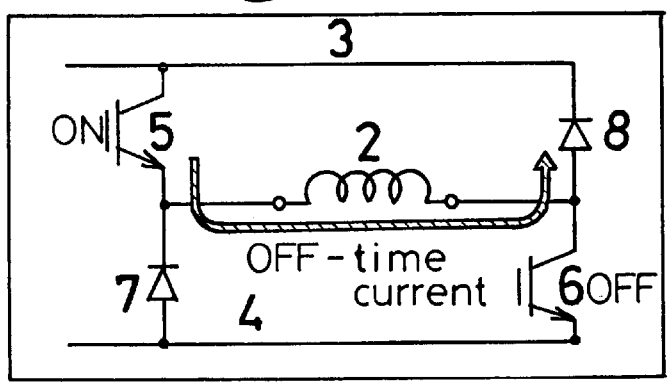
Figure 10C:
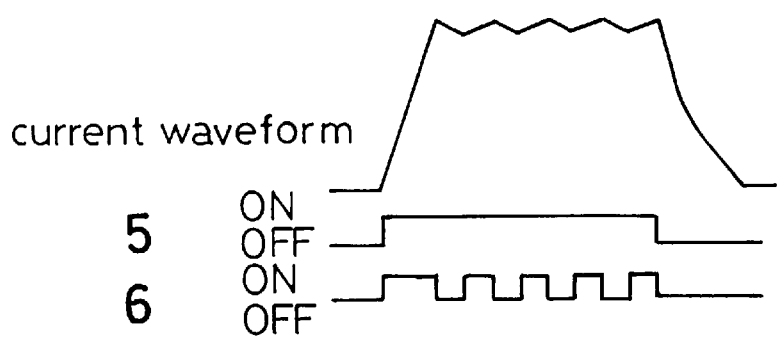

The micro-processor CPU performs a switching element changing procedure according to a flowchart shown in FIG. 6 and feeds a two-value signal indicative of the result to the switching circuit SWC in order to establish a connection between the transistor IGBT/U and one of the pwm signal generation circuit PWMC and the switching mode switching circuit SWMSWC and a connection between the transistor IGBT/L and the other of the pwm signal generation circuit PWMC and the switching mode switching circuit SWMSWC.

In the flowchart shown in FIG. 6, at step S10, it is checked whether or not a time elapse of 10 ms (milliseconds) has occurred. If the result is yes, the control goes to step S11 for checking whether or not the signal S9 is HIGH. If the result of step S11 is no, step S13 is executed to set the signal S9 HIGH. If the result of step S11 is yes, at step S12, the signal S9 is set to be LOW. Thus, the condition of the signal S9 is changed every 10 ms (milliseconds).

The current waveform indicative of the target current which is fed, as the digital signal S7, from the CPU to the memory RAM is stored in an address corresponding to the rotor angular position. The angle, as the digital signal S2, fed to the address decoder ASD in the current waveform generating circuit IPGC from the angle sensor RAS is converted into an address in the memory RAM. The current waveform generating circuit IPGC, whenever the angle changes, reads out the target current value which corresponds to the angle from the memory RAM. The resultant criteria value is analogized at the digital/analog converter D/A and is fed, as an analog signal S10, to the current comparison circuit ICPM by way of an output buffer BUF.

The energization/denergization determination circuit EDDC in the current waveform generating circuit IPGC creates a two-value signal S11 which represents whether or not the first phase coil CL1 is energized on the basis of the signal S2 from the angle sensor RAS and signals from the micro-processor CPU. The resultant sgnal S11 is outputted from the energization/denergization determination circuit EDDC to the switching mode switching circuit SWMSWC. The signal S11 takes HIGH and LOW when the first phase coil CL1 is energized and deenergized, respectively. If the signal S4 takes. LOW, which indicates of abnormal condition, the signal S11 remains LOW. By contrast, if the signal S4 takes HIGH, the signal S11 is set to be LOW temporally by being inputted with the reset pulse signal S3. Thereafter, the signal S11 is changed to HIGH from LOW when the rotor angular position represented by the signal S2 reaches the energization starting angle represented by the signal S5 and is changed to LOW from HIGH when the rotor angular position represented by the signal S2 reaches the energization terminating angle represented by the signal S6.

The PWM signal generating circuit PWMC creates a PWM signal or two-value signal S14 as a first driving signal and feeds the signal S14 to the SWC, while the switching mode switching circuit SWMSWC creates a two-value signal S25 as a first driving signal c and feeds the signal S25 to the SWC. The SWC creates two-value signals S22 and S23 and feeds the signals S22 and S23 to gate insulating type HIGH polar transistors or switching transistors IGBT/L and IGBT/U of the first phase coil driver DR1, respectively.

The first phase coil driver DR1 is made up of the transistor IGBT/L the transistor IGBT/U, a diode D1 and a diode D2. The transistor IGBT/L is interposed between one end of the first phase coil CL1 and a higher potential line (+). The transistor IGBT/U is interposed between the other end of the first phase coil CL1 and a lower potential line (−). The diode D1 is interposed between one end of the first phase coil CL1 and the lower potential line (−). The diode D2 is interposed between the other end of the first phase coil CL1 and the higher potential line (+).

Between one end of the first phase coil CL1 and the transistor IGBT/U, there is provided a current sensor IS for determining a current which passes actually through the first phase coil CL1. The current sensor IS issues an analog signal S12 indicative of the actual current passing through the first phase coil CL1 to comparison circuits ICMP1 and ICMP2.

The comparison circuit ICMP compares the analog signals S10 and S12 which represent the target current to be passed through the first phase coil CL1 and the actual current passing therethrough, respectively and feeds a two-value signal S13 which is indicative of the result to the PWM signal generating circuit PWMC. If the actual current passing through the first phase coil CL1 is less than the target current, the two-value signal S13 is set to be HIGH, and if the actual current is equal to or greater than the target current the two-value signal S13 is set to be LOW.

Figure 3:
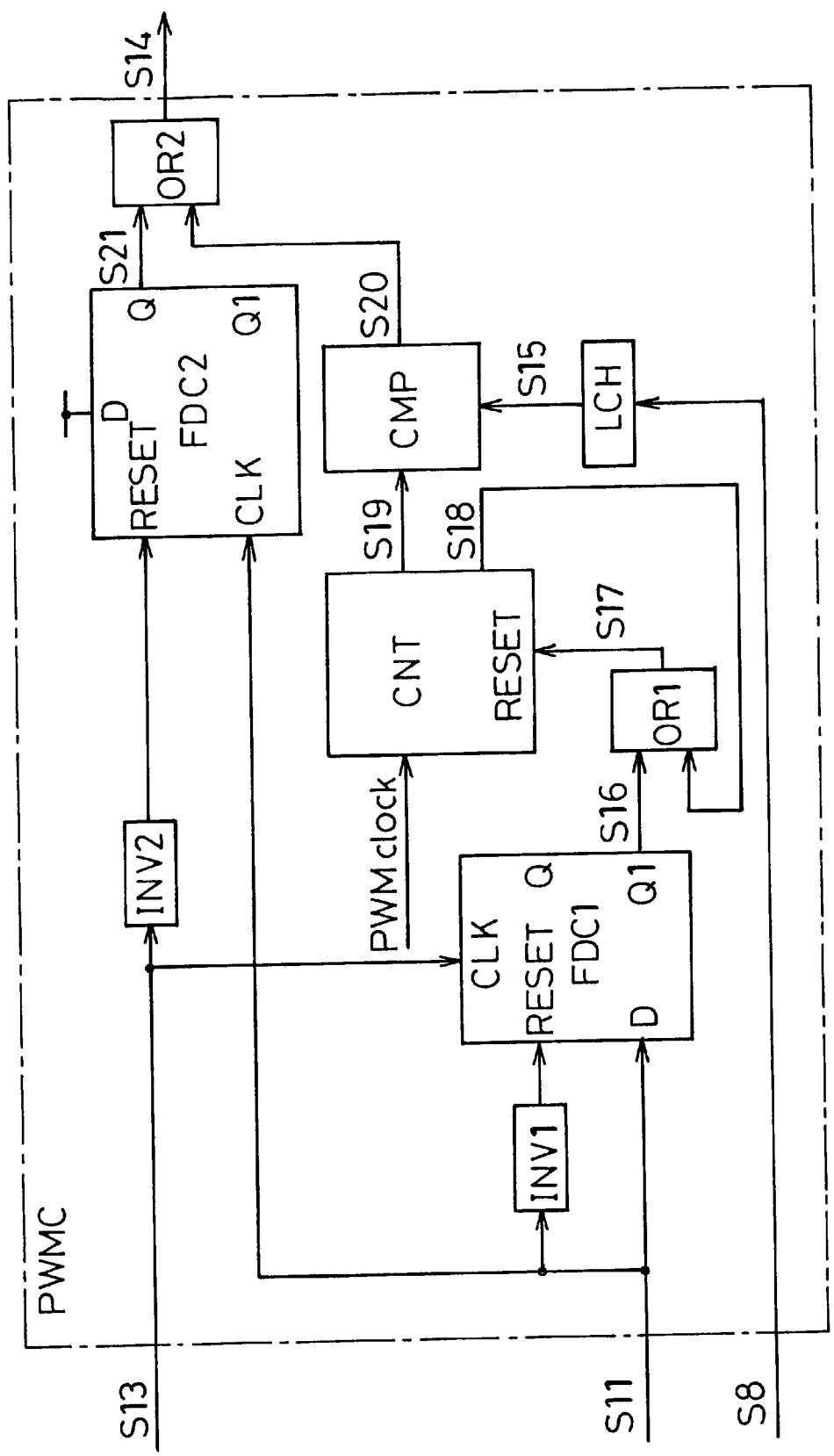
FIG. 3 illustrates a block diagram of a PWM signal generation circuit.

With reference to FIG. 3, there is illustrated a detailed structure of the PWM signal generating circuit PWMC. The digital signal S8 which is outputted from the CPU as an indication of PWM duty ratio is latched as a 12-bit digital signal S15 at a latch LCH and the resultant signal S15 is fed to a comparison circuit CMP. The two-value signal S11 outputted from the energization/denergization determination circuit EDDC is fed directly to an input terminal of a flip-flop FDC1 and an input terminal CLK of a flip-flop FDC2 and is fed, by way of an inverter INV1, the input terminal RESET of the flip-flop FDC1. The two-value signal S13 outputted from the comparison circuit ICMP is fed directly to an input terminal CLK of the flip-flop FDC1 and is also fed by way of an inverter INV2 to an input terminal RESET of the flip-flop FDC2.

The flip-flop FDC1 issues a two-value signal S16 from its inverting output terminal QI to one of input terminals of an OR-gate OR1. A two-value signal S17 outputted from the OR-gate OR1 is fed to an input terminal RESET of a 12-bit counter CNT. An overflow or a two-value signal S18 outputted from the 12-bit counter CNT is fed to the other input terminal of the OR-gate OR1. The 12-bit counter CNT counts the number of PWM clock signals and outputs a 12-digit signal S19 which represents the resulting number to the comparison circuit CMP.

The comparison circuit CMP compares the incoming signals S15 and S19 and outputs a two-value signal S20 as its result. The signal takes LOW and HIGH when the signal S19 is<the signal S15 and the signal S19 is≧the signal S15, respectively.

One of input terminals of an OR-gate OR2 is fed with the signal S20 outputted from the comparison circuit CMP, while the other terminal is inputted with a two-value signal S21 outputted from an output terminal Q of the flip-flop FDC2. The OR-gate OR2 outputs a signal PWH signal S14. It is to be noted that a fixed voltage is applied to an input terminal D of the flip-flop FDC2.

In the aforementioned PWMC, the two-value signal S11 changes from LOW to HIGH when an order is issued to start an energization of the phase coil CL1, which changes the output signal S21 of the flip-flop FDC2 from LOW to HIGH, thereby switching the PWH signal S14 from LOW to HIGH. In synchronization of the change of the signal S11 from LOW to HIGH, the two-value signal S13 changes from LOW to HIGH due to the fact that the signal S10 indicative of the target current to be passed through the phase coil CL1 becomes larger than the signal S12 indicative of the current which passes actually through the first phase coil CL1. Thereafter, immediately when the current which passes actually through the first phase coil CL1 reaches the criteria value, the flip-flop FDC2 is reset, thereby changing the signal S21 from HIGH to LOW. Thus, between the initiation of the energization of the first phase coil CL1 and the arrival of the actual current at the target current, the PWM signal S14 is being kept at HIGH.

On the other hand, the changing of the signal S11 from LOW to HIGH makes the output signal S16 of the flip-flop FDC1 HIGH, which brings the signal to HIGH. Then, the counting operation of the 12-bit counter CNT is terminated, which causes the signal S19 to be zero and the overflow signal S18 becomes LOW. Due to the fact that normally the signal S8 represents the PWH duty ratio which is greater than zero, the signal S19 becomes lower than the signal S15, with the result that the output signal S20 of the comparison circuit CMP becomes LOW.

Figure 7:
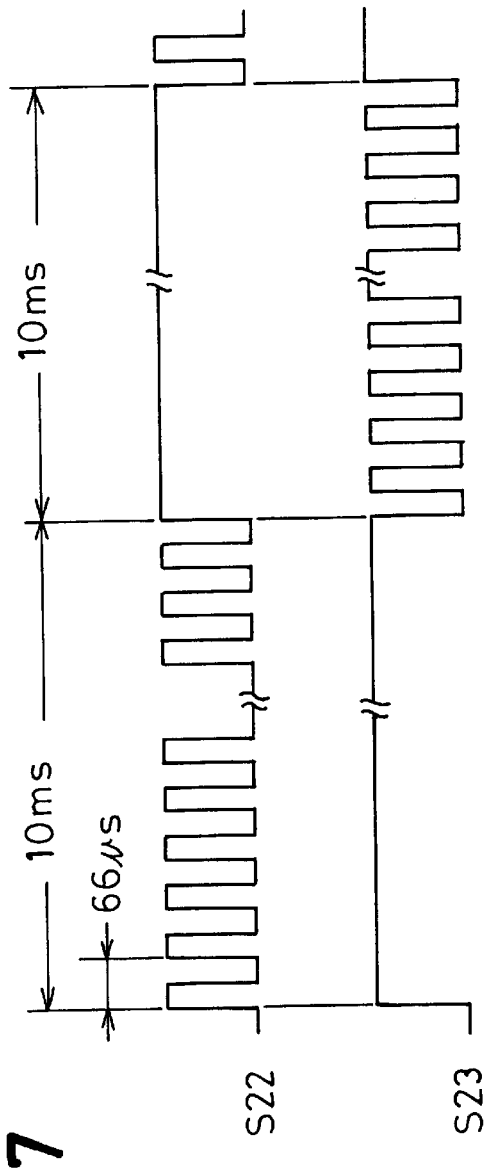
FIG. 7 illustrates time-charts of signals S22 and S23 when a load is driven by the three-phase switched reluctance motor.

After the signal S11 changes from LOW to HIGH, if the signal S13 changes from LOW to HIGH (i.e. after arrival of the actual current at the target current, when the actual current becomes lower than the target current again), the output signal S16 of the flip-flop FDC1 changes from HIGH to LOW, which switches the signal S17 from HIGH to LOW, with the result that the 12-bit counter CNT begins to count the PWM clock signal. Thus, the number represented by the signal S19 increases. When the increasing value represented by the signal S19 becomes equal to the value represented by the signal S15, the signal S20 changes from LOW to HIGH. Thereafter, if the 12-bit counter CNT overflows each of the signals S17 and 818 changes from LOW to HIGH, which rests the 12-bit counter CNT, with the result that the 12-bit counter CNT begins to count the number of the PWM clock signal. Thus, the signal S19 begins to represent zeros, thereby changing the signal S20 from HIGH to LOW. Resetting the 12-bit counter CNT changes the signal S18 to LOW again, the 12-bit counter CNT re-starts counting the pulse number of the PWM clock signal. Thus, the signal becomes LOW and HIGH alternately. Given a time duration t1 during which the signal S20 is LOW and a time duration t2 during which the signal 20 is HIGH, where the sum of the t1 and t2 is a fixed value of 66 microseconds in this embodiment as shown in FIG. 7, the value of t2/(t1+t2), which corresponds to the PWM duty ratio represented by the signal S8, is treated as the value of the PWM signal S14. At a time point when the signal S20 begins to repeat HIGH and LOW alternately, the signal S21 is LOW, the signal S14 which is in coincidence with the signal S20 becomes the PWM signal.

Thereafter, when the signal S11 changes from HIGH to LOW which is indicative of an order of terminating the energization of the first phase coil CL1, the output signal S16 of the flip-flop FDC1 is changed from LOW to HIGH, which changes the signal S17 to HIGH, with the result that the signal S19 remains a zero indication. Thus, the signal S20 remains a LOW condition and the signal S14 remains LOW.

Figure 5:
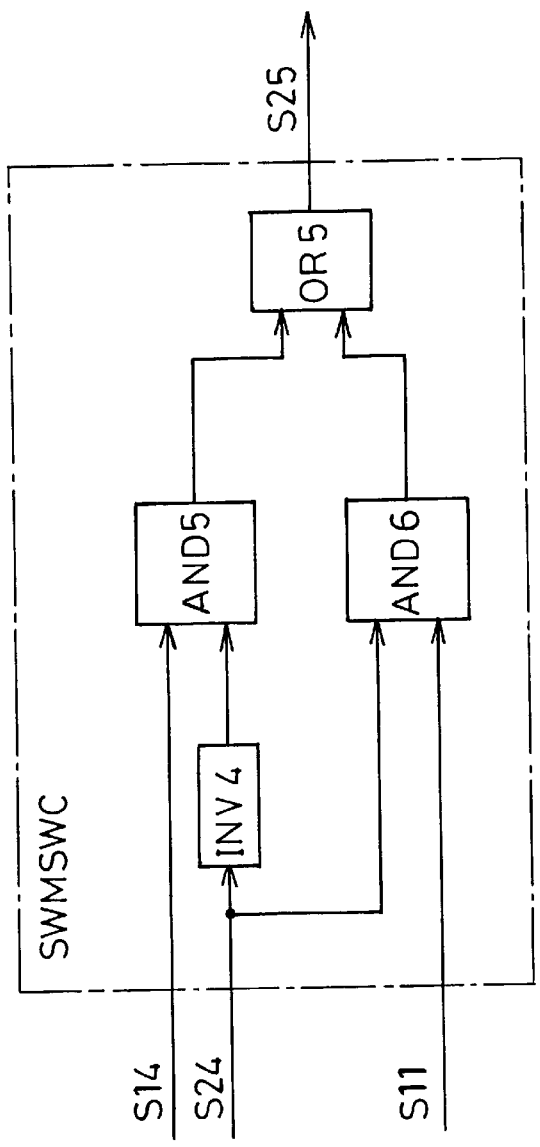
FIG. 5 illustrates a diagram of a switching mode changing circuit.

As illustrated in FIG. 5 the switching mode switching circuit SWMSWC includes an inverter INV4, two AND-gates AND5 and AND6, and an OR-gate OR5. A signal S24 which is issued or outputted from the CPU is fed to one of input terminals of the AND-gate AND6. The signal S24 is also fed to one of input terminals of the AND-gate AND5 by way of the inverter INV4. The other input terminal of the AND-gate AND5 is fed with the signal S14 from the PWM signal generating circuit PWMC, while the other input terminal of the AND-gate AND6 is fed with the signal S11 from the energization/denergization determination circuit EDDC. The OR-gate OR5 is inputted with signals from the respective AND-gates AND5 and AND6 and issues or outputs a signal S25 to the switching circuit SWC.

When the signal S24 indicates LOW level which represents to initiate regenerative braking operation, if the signal S14 outputted from the PWM signal generation circuit PWMC is inputted to the switching mode switching circuit SWMSWC, the signal S14 is outputted therefrom as signal S25. When the signal S24 outputted from the CPU indicates HIGH level which represents not to initiate regenerative braking operation, if the signal S11 outputted from the energization/denergization determination circuit EDDC is inputted to the switching mode switching circuit SWMSWC, the signal S11 is outputted therefrom as the signal S25.

Figure 4:
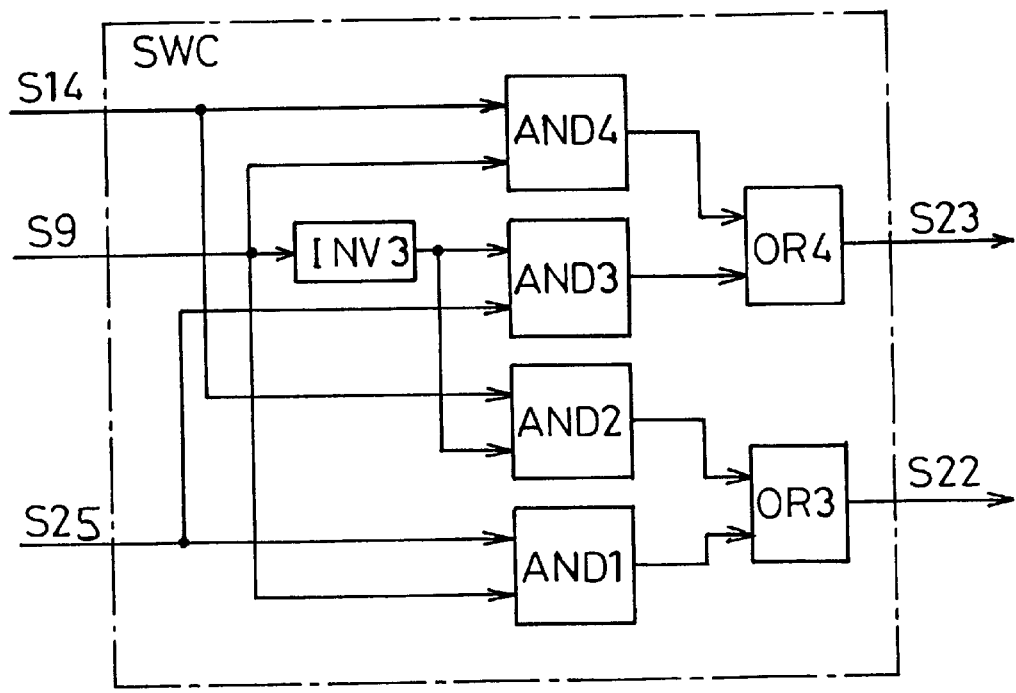
FIG. 4 illustrates a diagram of a switching circuit.

As depicted in FIG. 4, the switching circuit SWC is made up of four AND-gates AND1. AND2, AND3, and AND4, two OR-gates OR3 and OR4, and an inverter INV3. The signal S25 outputted from the switching mode switching circuit SWMSWC is fed to one of input terminals of the AND-gate AND1 and one of input terminals of the AND-gate AND3. The signal S14 outputted from the PWM signal generation circuit PWMC is fed to one of input terminals of the AND-gate AND2 and one of input terminals of the AND-gate AND4. The signal S9 outputted from the microprocessor CPU is fed to the other input terminal of the AND-gate AND1 directly, is fed to the other input terminal of the AND-gate AND4 directly, and is fed, by way of the inverter INV3, to the other input terminals of the respective AND-gates AND2 and AND3. The signals outputted from the respective AND-gates AND1 and AND2 are fed to the OR-gate OR3, whose output signal S22 is fed to the transistor IGBT/L. The signals outputted from the respective AND-gates AND3 and AND4 are fed to the OR-gate OR4, whose output signal S23 is fed to the transistor IGBT/U.

In the SWC, if the signal S23 is at HIGH level, the signals S22 and S23 are in coincidence with the respective signals S25 and S14. On the other hand, if the signal S9 is at LOW level, the signals S23 and S22 are in coincidence with the respective signals S25 and S14. As described above, the signal S9 takes HIGH level and LOW level alternately every 10 microseconds, which alternates the relationship between each of the signals S22 and S23 and each of the signals S14 and S25 every 10 microseconds.

The transistor IGBT/U is turned on and turned off when the signal S22 is at HIGH level and LOW level, respectively, while the transistor IGBT/L is turned on and turned off when the signal S23 is at HIGH level and LOW level, respectively.

When the signal S24 outputted from the micro-processor CPU is at HIGH level which represents that no regenerating braking operation is made, the signal S25 is in coincidence with the signal S11. When the signal S9 outputted from the CPU is at HIGH level, the signals S22 and S23 are in coincidence with the signals S25 and S14, respectively. When each of the signals S24 and S9 is at HIGH level, if the signal S11 becomes LOW level, each of the signals S14 and S25 becomes LOW level. Thus, when the signal S22 and the signal S23 are bought into LOW level the transistors IGBT/U and IGBT/L are turned off with the result that a current from a power supply (not shown) fails to pass through the first phase coil CL1.

When both of the signals S24 and S9 are at HIGH level, if the signal S11 changes from LOW level indicative of turned-off condition to HIGH level indicative of turned-on condition, both of the signals S14 and S25 are turned to HIGH level from LOW level. Thus, the signals S22 and S23 change from LOW level to HIGH level which turns the transistors IGBT/U and IGBT/L on, thereby passing the power supply current through the first phase coil CL1.

Until the time elapse of 10 microseconds is attained from the issue of the signal S9, the signal S9 is kept at HIGH level. While the signal S9 is at HIGH level, if the current which passes through the first phase coil CL1 exceeds a criteria or reference value, the signal S14 takes HIGH level and LOW level alternately at a cycle of 66 microseconds with the PWM duty ratio represented by the signal S8, with the result that the signal S22 begins to alternate HIGH level and LOW level, thereby alternating ON condition and OFF condition of the transistor IGBT/L. On the other hand, the transistor IGBT/U continues to be ON condition as a result of the continual HIGH level of the signal S25. Thereafter, if the signal S9 changes from HIGH level to LOW level, the signals S22 and S23 are so changed as to be in coincidence with the signals S23 and S25, respectively, with the result that the ON condition of the transistor IGBT/L is continued for 10 milliseconds and the transistor IGBT/U alternates its ON condition and OFF condition. Thus, under the condition that both of the signals S24 and S11 are at HIGH level, if the current passing through the first phase coil CL1 exceeds the target current value, as shown in FIG. 7, a third chopping energization mode and a second chopping energization mode are operated or executed alternately every 10 milliseconds in order to control of the current passing through the first phase coil CL1 toward the target current value. The third chopping energization mode is to alternate ON condition and OFF condition of the transistor IGBT/L by alternating HIGH level and LOW level of the signal S22 while ON condition of the transistor IGBT/U is being continued after the change of the signal S23 to HIGH level. The second chopping energization is to alternate ON condition and OFF condition of the transistor IGBT/U by alternating HIGH level and LOW level of the signal S22 while ON condition of the transistor IGBT/L is being continued after the change of the signal S23 to HIGH level. Thus, a heat-generating amount of the transistor IGBT/U and a heat-generating amount of the transistor IGBT/L are equalized, which brings a required time for reaching the permissible temperature limit of each of the transistors IGBT/L and IGBT/U which is longer than the continual time of either of the second chopping mode and the third chopping mode.

When the signal S24 is at LOW level which represents initiation of regenerative braking operation the signal S25 is in coincidence with the signal S14. Thus, independent of the level of the signal S9, each of the signals S22 and S23 is in coincidence with the signal S14. If the signal S11 changes from LOW level indicative of denergization to HIGH level indicative of energization, each of the signals S14 and S25 changes from LOW level to HIGH level, which results in each of the signals S22 and 823 changing from LOW level to HIGH level, thereby turning on the transistors IGBT/L and IGBT/U. Thus, the power source current passes through the first phase coil CL1. When such a current exceeds the target current value, each of the signals S14 and S25 alternates HIGH level and LOW level at a cycle of 66 microseconds, with the PWM duty ratio represented by the signal S22, which results in each of the signals S22 and S23 beginning to alternate LOW level and HIGH level in synchronization with the signal s14. Thus, a first chopping mode is executed wherein one of the transistors IGBT/L and IGBT/U alternates HIGH level and LOW level in synchronization with the other of the transistors IGBT/L and IGBT/U, thereby controlling the current passing through the first phase coil CL1 close to the target current value.

As previously described though each of the second control unit CON2 having a second phase coil and the third control unit CON3 having a third phase coil are substantially identical with the first control unit CON1 in construction, the angle sensor RAS, the memory ROM, and the CPU are commonly used by the first control unit CON1, the second control unit CON2, and the third control unit CON3.

The second phase coil has a phase difference of 15 degrees (45÷3 degrees) relative to the first phase coil CL1 in energization starting angle, energization terminating angle, and current waveform. Likewise, the third phase coil has a phase difference of 30 degrees (45÷3×2 degrees) relative to the first phase coil CL1 in energization starting angle energization terminating angle, and current waveform. The, micro-processor CPU calculates the energization starting angle, the energization terminating angle, and the current waveform of the second control unit CON2 by doing a phase shifting of 15 degrees (45÷3 degrees) relative to the first phase coil CL1 and the resultant energization starting angle and the energization terminating angle, and the current waveform are stored similar to those of the first control unit CL1. Similarly, the micro-processor CPU calculates the energization starting angle, the energization terminating angle, and the current waveform of the third control unit CON3 by doing a phase shifting of 15 degrees (45÷3×2 degrees) relative to the first phase coil CL1 and the resultant energization starting angle and the energization terminating angle, and the current waveform are stored similar to those of the first control unit CL1.

As detailed above, in the chopping energization control device in accordance with the present invention, when an electric motor is turned on for driving a load, two modes are alternately executed wherein one mode is to turn cyclically on-and-off a first switching elements with the second switching element remaining at HIGH and the other mode turns cyclically on-and-off the second switching element with the first element switching element remaining at HIGH. Thus, the amount of heat generation at the first switching element becomes equal to the amount of heat generation at the second switching element, with the result that when employing this chopping energization control device the required time for reaching the permissible limit temperature of each of the first switching element and the second element becomes longer than when only one of the modes is employed.

The invention has thus been shown and described with reference to a specific embodiment, however, it should be understood that the invention is in no way limited to the details of the illustrates structures but changes and modifications may be made without departing from the scope of the appended claims.

What is claimed is:

1. A chopping energization control device for adjusting a current which passes through a phase coil of an electric motor when the motor drives a load, the chopping energization control device comprising:

a first switching element interposed between one end of the phase coil and a high potential line of a power supply;

a second switching element interposed between the other end of the phase coil and a low potential line of the power supply; and switching element driving signal generating means for generating a first driving signal and a second driving signal, the first driving signal keeping ON one of the first switching element and second switching element during a predetermined period within energization period of the phase coil, the second driving signal turning ON and OFF the other switching element repeatedly during the predetermined period, wherein each of the first driving signal and the second driving signal is alternately transmitted to each of the first switching element and the second switching element respectively each time the predetermined period elapses.

2. The chopping energization control device according to claim 1, further comprising:

switching means interposed between the switching element driving signal generating means and each of the first switching element and the second switching element; and switching instruction means for ordering the switching means to replace one of a signal transmission path for the first driving signal and a signal transmission path for the second driving signal with the other each time the predetermined period elapses.

3. The chopping energization control device according to claim 1, wherein the switching element driving signal generating means is a programmed instruction of a microprocessor.

4. The chopping energization control device according to claim 1, wherein each of the first switching element and the second switching element is in the form of a gate-insulated-type bipolar transistor.

* * * * *